United States Patent [19]

Foley et al.

[11] 4,017,657

[45] Apr. 12, 1977

[54] PVC FOAMS

[75] Inventors: Kevin M. Foley, Toledo; Frank P. McCombs, Granville; Francesco M. Vigo, Heath, all of Ohio

[73] Assignee: Owens-Corning Fiberglas Corporation, Toledo, Ohio

[22] Filed: Oct. 20, 1975

[21] Appl. No.: 624,145

Related U.S. Application Data

[63] Continuation-in-part of Ser. No. 523,596, Nov. 14, 1974, abandoned.

[52] U.S. Cl. .............................. 428/95; 260/2.5 P; 428/96; 428/310; 428/313; 428/391; 428/429
[51] Int. Cl.$^2$ ...................... B32B 3/02; B32B 3/26
[58] Field of Search ............ 428/95, 315, 310, 313, 428/428, 429, 391, 96; 260/2.5 P

[56] References Cited

UNITED STATES PATENTS

| | | | |
|---|---|---|---|
| 3,262,827 | 7/1966 | Kallander et al. | 428/315 |
| 3,338,845 | 8/1967 | Alzner et al. | 260/2.5 P |
| 3,383,337 | 8/1967 | Garling | 260/2.5 P |
| 3,728,182 | 4/1973 | Wisotzky et al. | 428/95 |
| 3,798,189 | 3/1974 | Simoneau et al. | 260/2.5 P |
| 3,837,988 | 9/1974 | Hennen et al. | 428/95 |

*Primary Examiner*—William J. Van Balen
*Attorney, Agent, or Firm*—John W. Overman; Patrick P. Pacella

[57] ABSTRACT

We have developed a polyvinyl chloride foam with a smooth surface and uniform cell size. The foams also are resilient and abrasion resistant, making them especially suited for use in carpeting materials. To do this, we add along chain silane or epoxide to the foam.

6 Claims, No Drawings

PVC FOAMS

This is a continuation-in-part of application Ser. No. 523,596 filed Nov. 14, 1974, now abandoned.

This invention relates to plastic foams derived from polyvinyl chloride.

Industry has been using polyvinyl chloride foams for quite some time as wall boards, thermal and sound insulation, shipping containers, and the like. The foams are prepared by first adding a polyvinyl chloride resin to a plasticizer to form a plastisol. A blowing agent then is added to the plastisol as are other materials such as fillers, absorbers, pigments, and the like. The plastisol then is foamed with various mechanical and chemical techniques. One technique involves the mechanical whipping of air into the plastisol.

Most vinyl foams, however, are expanded at atmospheric pressure using both high and low decomposition temperature blowing agents. Generally a plastisol-blowing agent mixture is formed and passed through an over where the blowing agent decomposes to form a gas. The gas develops a cellular structure in the plastisol.

We now have developed a polyvinyl chloride foam with a smooth surface and uniform cell size. The foams also are resilient and abrasion resistant, making them especially suited for use in carpeting materials. In one embodiment, we use the foams as coatings for glass textile yarns or strands which are tufted into glass fiber carpets. In another embodiment, the foam is used as backing for carpeting materials. Our development depends upon the addition of a long chain silane or epoxide to the foam.

The long chain epoxides we use in this invention are represented by the formula:

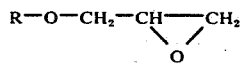

wherein R is an alkyl radical having 5 to 50 carbon atoms. Preferably R has 8 to 20 carbon atoms. The above formula represents an alkyl-glycidyl ether.

The long chain silanes we use in this invention are represented by the formula:

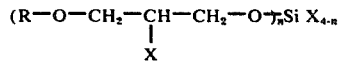

wherein $n$ is an integer from 1 to 4, X is chlorine, bromine, fluroine, or iodine; and wherein R is an alkyl radical having 5 to 50 carbon atoms. Preferably $n$ is 3 or 4, X is chlorine or bromine, and R has 8 to 20 carbon atoms. If desired, one or two of the X groups can be a bis-phenol A diepoxide.

We produce these silanes by reacting a silicon tetrahalide with the long chain epoxides of this invention. We believe the reaction proceeds in accordance with a known manner as U.S. Pat. No. 2,650,934 describes.

The reaction conditions we employ to produce these silanes are not critical to the practice of this invention as we have found that the reaction proceeds at room temperature. However, we can use a reaction temperature within the range of 10° to 100° C, depending somewhat on the boiling point of the silicon halide we employ. We carry out the reaction in the absence of any solvent, although we can employ inert organic solvents, such as normally liquid aliphatic hydrocarbon solvents. In general, we make use of 1 mole of the epoxide for every mole of halogen atom contained in the silicon halide. Where the silicon halide is a silicon tetrahalide, we use a mole ratio of the silicon tetrahalide to epoxide within the range of 3.8 to 4.5, and preferably 3.95 to 4.05.

Specific examples include epoxides or silanes where R is predominantly n-octyl ($C_8$) and n-decyl ($C_{10}$), $C_{12}$ and $_{14}$ n-hexadecyl ($C_{16}$) and n-octadecyl ($C_{18}$).

The amount of silade or epoxide ranges from 1 to 20 weight percent based on the weight of the polyvinyl chloride. Preferably, the amount ranges from 5 to 15 weight percent.

The blowing agents we employ in this invention are materials such as azodicarbonamide ($H_2NCONNCOCH_2$) and azobisisobutyronitrile ($CH_3C(CN)NNC(CN)(CH_3)_2$). We prefer to use azodicarboamide.

If desired, conventional fillers, UV-absorbers, pigments, and the like also can be employed.

The polyvinyl chloride plastisol is cured and blown at a temperature ranging from 420° F to 620° F for a period of time ranging from 10 seconds to 4 minutes.

The following examples further illustrate our invention.

EXAMPLE I

| Ingredient | Weight, grams |
|---|---|
| Mixture A | |
| Polyvinyl chloride resin (Geon 121 × 241 from B. F. Goodrich) | 1000 |
| $Sb_2O_3$ | 50 |
| Talc | 80 |
| Mixture B | |
| Dioctyl phthalate | 650 |
| Azodicarboamide in dioctyl phthalate | 50 |
| Vinyl stabilizer | 50 |
| Epoxidized Soybean Oil | 50 |
| Mixture C | |
| Cell Stabilizer | 10 |
| Napthol Spirits | 15 |

$$\left( R-O-CH_2-\underset{Cl}{CH}-CH_2-O \right)_4 Si$$

wherein R is largely n-hexadecyl and n-octadecyl

Each mixture was stirred under agitation to mix the $n$ ingredients. Mixture A was added to Mixture B and the two were thoroughly mixed. Mixture C then was added to a 100g aliquot of the mixture of A plus B. A sample of this mixture was cured and blown in an oven for 4 minutes at a temperature of 374° F. Visual inspection revealed a smooth surfaced, even-celled foam. The foam was resilient and abrasion resistant.

EXAMPLE II

Example I was repeated except that the epoxide

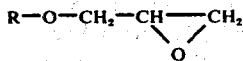

wherein R is largely n-hexadecyl and n-octadecyl was employed in place of the silane. Visual inspection revealed a smooth surfaced, even-celled foam. The foam was resilient and abrasion resistant.

We prepared glass fiber carpets employing the foams of Examples I and II.

EXAMPLE III

A glass fiber bundle is wound on a cylindrical tube, plied three strands to a ply and then transferred to to a cone to make it easier to doff when tufting (making the carpet). The glass fibers were sized with a conventional vinyl conpatible sizing for carpet yarn and had a fiber diameter of 0.00025 inch. After the carpet is formed, the ingredients of Examples I and II are calendered separately onto the back of the carpet in a batch or continuous process. The coated glass fiber carpets then is passed through an oven where the backings are cured and blown at a temperature of 374° F for 4 minutes.

EXAMPLE IV

The ingredients of Examples I and II were placed in separate baths. A glass fiber bundle then was passed through each bath and then through a small orifice to control the amount of plastisol coated on the bundle. The glass fibers were sized with a conventional vinyl compatible sizing for carpet yarn and had a fiber diameter of 0.00025 inch. The diameter of the orifice was about 0.021 inch. The percent pick up was 65. The process was repeated with another bath of a higher molecular weight plastisol with no foaming agent. The percent pick up was 15. The coated fibers then were passed directly into an oven where the plastisols were foamed and blown at a temperature of 374° F for 4 minutes. The cured, coated glass fiber was wound on a cylindrical tube, plied three strands to a ply, and then transferred to a cone which makes it easier to doff when tufting (making the carpet). After the carpet was formed, it was back coated with a conventional carpet backing material.

Examples III and IV demonstrate that the foams of this invention can be used as carpeting materials. Tufting employs the same principle as a sewing machine except that the loop is made and then cut off to make a cut pile.

We intend to include modifications and variations within the scope and spirit of this invention.

We claim:

1. A polyvinyl chloride foam produced by curing and blowing a polyvinyl chloride plastisol which comprises a long chain silane represented by the formula

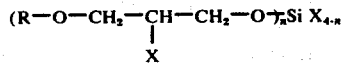

wherein R is an alkyl radical having from 5 to 50 carbon atoms, $n$ has a value within the range from 1 to 4 and X represents chlorine, bromine, fluorine or iodine.

2. The polyvinyl chloride foam of claim 1 in which said long chain silane comprises the reaction product of a silicon tetrahalide and an alkyl-glycidyl ether represented by the formula

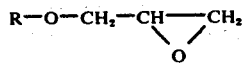

wherein R is as defined.

3. The polyvinyl chloride foam of claim 1 in which said long chain silane is present in an amount within a range of from about 1 to about 20 weight percent based on the weight of the polyvinyl chloride.

4. Glass fibers having a coating on the surfaces of the fibers in which the coating comprises the polyvinyl chloride foam as defined in claim 1.

5. A glass fiber carpet produced by tufting the coated glass fibers of claim 1.

6. A backing for carpeting which backing comprises the polyvinyl chloride foam as defined in claim 1.

* * * * *